(12) United States Patent
Cazanas et al.

(10) Patent No.: US 8,630,608 B2
(45) Date of Patent: Jan. 14, 2014

(54) SYSTEMS AND METHOD FOR AUTOMATING A RESPONSE FROM A MOBILE STATION

(75) Inventors: Carlos A. Cazanas, Bethlehem, PA (US); Brian Tims, Nazareth, PA (US); Azam Khan, Franklin, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 3 days.

(21) Appl. No.: 13/596,461

(22) Filed: Aug. 28, 2012

(65) Prior Publication Data

US 2012/0322473 A1    Dec. 20, 2012

Related U.S. Application Data

(63) Continuation of application No. 12/787,997, filed on May 26, 2010, now Pat. No. 8,275,351.

(51) Int. Cl.
*H04W 4/12* (2009.01)
(52) U.S. Cl.
USPC ...................................... 455/404.1; 455/466
(58) Field of Classification Search
USPC ............ 455/404.1, 404.2, 412.1, 412.2, 413, 455/418, 419, 466
See application file for complete search history.

(56) References Cited

U.S. PATENT DOCUMENTS

| 6,640,115 | B1 * | 10/2003 | Fujimoto et al. ............... | 455/567 |
| 7,319,880 | B2 | 1/2008 | Sin | |
| 2008/0268882 | A1 | 10/2008 | Moloney | |
| 2010/0151889 | A1 * | 6/2010 | Chen et al. .................... | 455/466 |
| 2011/0093161 | A1 | 4/2011 | Zhou et al. | |
| 2011/0117903 | A1 | 5/2011 | Bradley | |

OTHER PUBLICATIONS

"Maxis—Personal—Mobile Services—Message Plus," one page, retrieved from the internet on Mar. 11, 2009.
"Message Plus: Terms and Conditions," http://www.maxis,com.my/personal/general/tnc_MessagePlus.asp, one page, retrieved from the internet on Mar. 11 2009.
"NewNet SMserver, Wireless Short Message Service Tutorial," ADC NewNet, Inc., 17 pages, Copyright 1999.
"SMS Forwarder," Wireless Labs Technologies, http://www.wireless-labs.com/smsforwarder/, retrieved from the inernet on Mar. 11, 2009.
"SMS Forwarder User Guide," Wireless Labs Technologies, nine pages, Copyright 2006-2008.
"WirelessMoves: SMS Forwarding," http://mobilesociety.typepad.com/mobile_life/2009/02/sms-forwarding.html, two pages, Feb. 28, 2009. html, downloaded Mar. 11, 2009.

* cited by examiner

*Primary Examiner* — Sam Bhattacharya

(57) ABSTRACT

Mobile stations, methods, functionality, and articles of manufactures enable mobile stations to automatically respond to a messaging service message. An application is stored and executed on a mobile station. The application provides functionality to determine response message content for use by the application, receive a mobile messaging service message, and respond automatically, without interaction by the end-user of the mobile station, send a response to the received mobile messaging service message containing the message content for the sender of the received mobile messaging service message. The automatic response application may be user activated or automatically activated under various circumstances including at a specific time, on a regularly scheduled basis, upon detection of movement faster than a predetermined speed, or upon detection of the station being in a mobile vehicle.

20 Claims, 4 Drawing Sheets

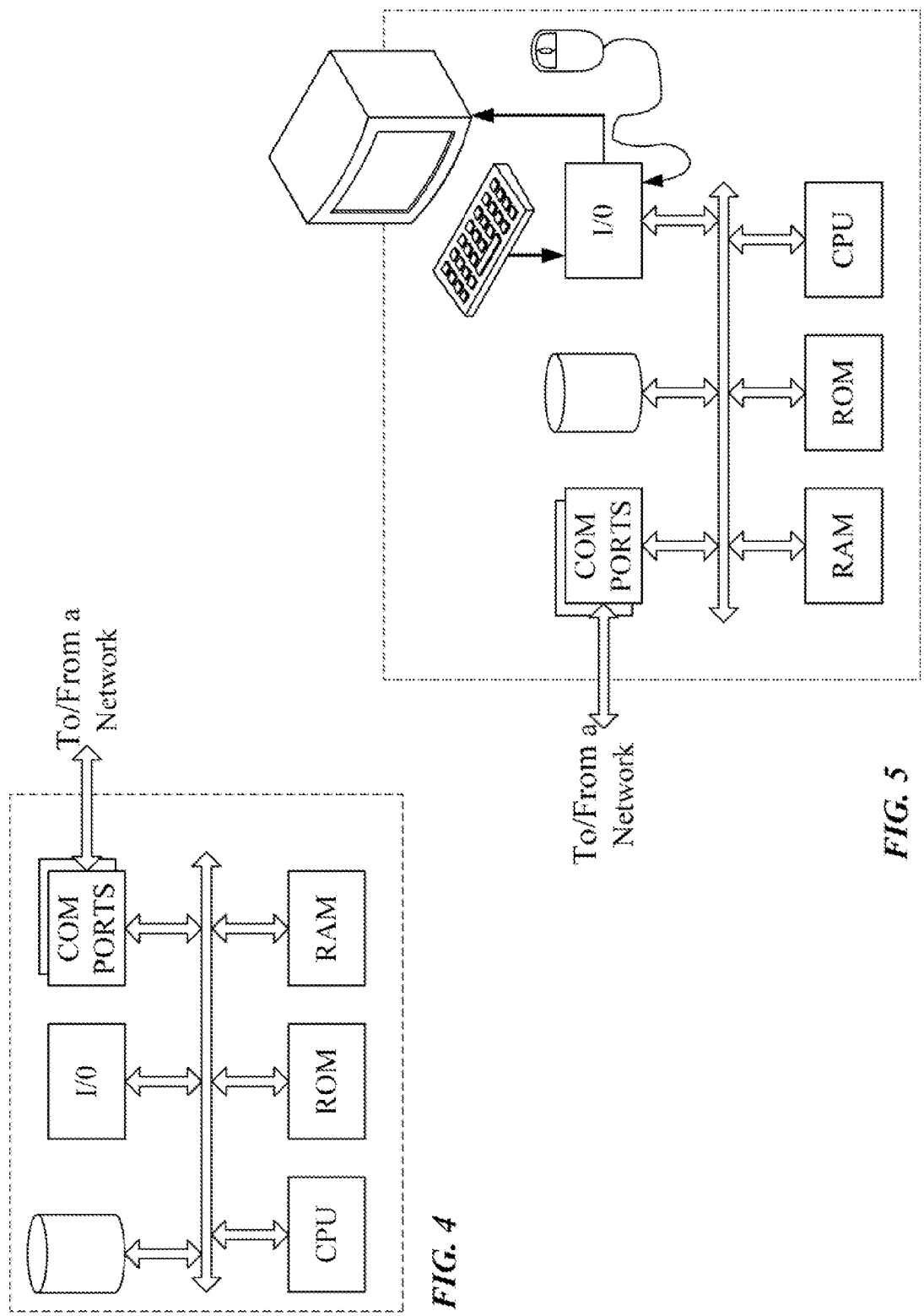

SYSTEMS AND METHOD FOR AUTOMATING A RESPONSE FROM A MOBILE STATION

RELATED APPLICATION

The present application is a continuation and claims the benefit of U.S. application Ser. No. 12/787,997, filed May 26, 2010, the disclosure of which is entirely incorporated herein by reference.

BACKGROUND

There may be times when the user of a mobile station does not want to respond to various communications received by the mobile station. For example, a user may attend a movie and does not want to respond to messaging service messages (e.g., simple messaging service messages 'SMS', enhanced messaging service messages 'EMS', and multimedia messaging service messages 'MMS'). Traditionally, the received messages go unresponded to for a period of time.

Another example of a time when the user of a mobile station may not wish to respond to incoming messaging service messages is when the user is operating an automobile. In fact, mobile station usage while driving has been banned in at least one state and it is predicted others will follow soon. Not only is talking without a hands-free device prohibited, but e-mailing and texting (i.e., sending messaging service messages such as SMS, MMS, and EMS type messages) have also been banned.

While a delayed response may be acceptable in some cases, it may not always be desirable. Hence, it may be useful to develop systems and methods for a mobile station user to notify people who send them messaging service messages that the user is busy and can not reply to the message until a later time.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 4 is a simplified functional block diagram of a computer that may be configured as a host or server.

FIG. 5 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Functionality, systems, and methods of automatically responding to messaging service messages by a mobile station are shown and described. Various illustrated examples reference a "do-not-disturb" application that is executed on a mobile station. The application can be triggered to automatically execute based on numerous factors such as the rate of travel of the mobile station, the pairing of the mobile station with a portion of a vehicle, or in response to a predetermined schedule. Of course, the application may be manually started by the end-user of the mobile station as well. The application causes the mobile station to respond to the incoming messaging service message with a predetermined response, which the station sends back through the network to notify the sender that the recipient is not available to respond at the current time. Such an application provides, for example, increased safety when the end-user of the mobile station is operating a vehicle.

Figure 1:
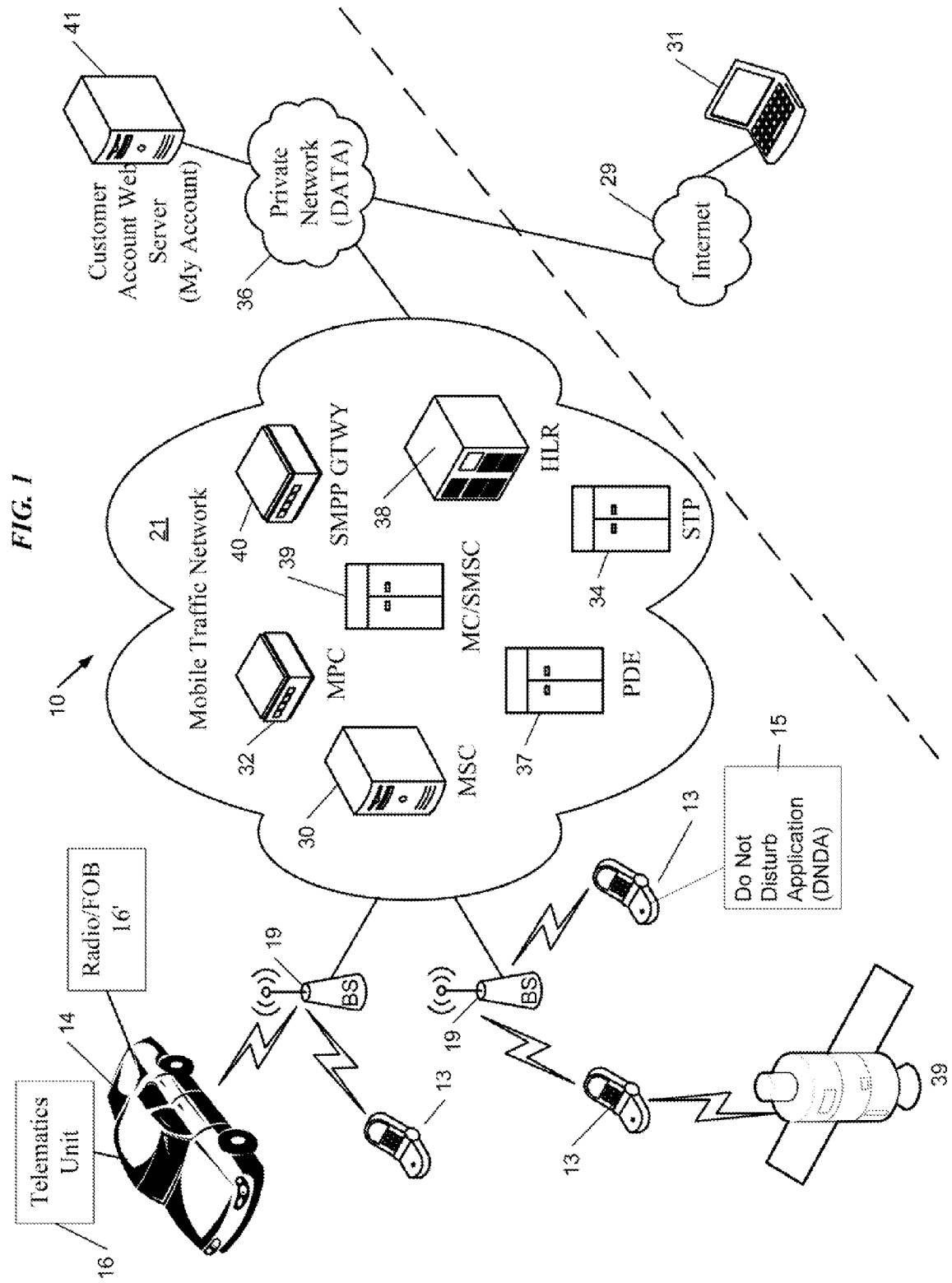
FIG. 1 is a functional block diagram that depicts various components of an exemplary mobile communications network.

Reference now is made in detail to the examples illustrated in the accompanying drawings and discussed below. FIG. 1 illustrates a mobile communication network 10 as may be operated by a carrier or service provider to provide a wide range of mobile communication services and ancillary services or features to its subscriber customers and associated mobile station (MS) users. The elements collectively indicated by the reference numeral 10 generally are elements of the network and are operated by or on behalf of the carrier, although the mobile stations typically are sold to the carrier's customers. The mobile communication network 10 provides communications between mobile stations as well as communications for the mobile stations with networks and stations (not shown) outside the mobile communication network 10.

The wireless mobile communication network 10 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard or other standards used for public mobile wireless communications. The mobile stations 13 may be capable of conventional voice telephone communications and data communications.

For purposes of later discussion, several mobile stations 13 appear in the drawing, to represent examples of the mobile stations that may receive various services via the mobile communication network 10. For example, the mobile stations 13 can receive location based services (LBS) that leverage the use of an internal global position system (GPS) transceiver. The GPS receiver alone, or in combination (aGPS) with other network elements can determine the latitude and longitude of the mobile station 13. The location of the mobile station 13 can be used to provide one or more location based services (LBS) and determine the rate at which a mobile station is traveling as well a direction of travel if needed. One of example of a location based service is navigational assistance (e.g., driving directions, turn-by-turn navigation, route calculation, points of interest location, etc.).

Mobile stations 13 typically take the form of portable handsets, smart-phones or personal digital assistants, although they may be implemented in other form factors. At least one of the mobile stations 13, for example, can include a "Do Not Disturb" Application (DNDA) 15, that can be downloaded to the mobile station 13 or added thereto in some other way. The DNDA 15 is provided in a mobile station 13 that otherwise provides normal mobile communications services of the network 10 to a user of the mobile station. The DNDA 15 may be provided in any one mobile station, in a group (but not all) of the mobile stations, or in all users' mobile stations 13. The DNDA 15 can leverage and cooperate with the GPS receiver of the mobile station 13 to determine the rate of travel of the mobile station. For example, the rate of travel can be used to automatically enable the DNDA 15 to automatically respond to messaging service messages (e.g., simple messaging service messages (SMS), enhanced messaging service messages (EMS), and multi-media messaging service messages (MMS)) received at the mobile station 13 while it exceeds a predefined rate of travel.

In addition, a telematics unit 16 in an associated vehicle 14 can also be a mobile device that communicates with components of the mobile communications network 10. From the view of the network 10, the telematics unit 16 is essentially another mobile station 13. Traditionally, the telematics unit 16 provides emergency and other related services. Examples include crash detection, road side assistance, and navigation related functionality, such as turn-by-turn directions. The telematics unit 16 is provisioned to operate in a manner similar to a mobile station 13, although the network services available to telematics unit may be limited when compared to those provided to a typical mobile station 13. For example, telematics unit 16 may be provisioned only to send/receive voice and SMS type messaging communications to/from call centers of a telematics service provider or specific elements (e.g., on-demand multimedia services servers) of the network 10. One example of a telematics unit 16 is an On-Star unit. In some instances, the telematics unit 16 and the mobile station 13 can be paired using Bluetooth technology. The speed of the vehicle 14, and by extension the speed of the telematics unit 16 and mobile station 13, can be used to automatically activate the DNDA 15.

For example, when the mobile station 13 travels at a rate of or greater than 10 miles-per-hour, the DNDA 15 can be activated to enable the mobile station 13 to begin automatically responding to incoming messaging services messages. This can occur when the vehicle 14 exceeds that rate of travel. Also, the DNDA 15 can be activated upon pairing the mobile station 13 with the telematics unit 16. Further, the activation can occur when the mobile station 13 is paired with a Bluetooth communication unit (e.g., a hands-free unit or radio with Bluetooth capabilities 16') with the vehicle 14. In another instance, a fob 16' is attached to the vehicle 14 (e.g., behind the rearview mirror) and used to pair with mobile station 13 to cause the activation of the DNDA 15.

The response message indicates that the end user of the mobile station 13 is traveling and can not respond at this time. The response message can be an SMS message back to the sender of the incoming SMS message. The response message can be user configurable each time the DNDA 15 application is executed. Also, predetermined responses can be created or provided and used. Also, response messages can be customized based on the sender of the incoming message.

The DNDA 15 can be configured to execute on many different types of mobile stations 13. That is, the DNDA 15 program can be written to execute on a binary runtime environment for mobile (BREW-based) mobile station, a Windows Mobile based mobile station, android, I-Phone, Java Mobile, or RIM based mobile station. These types of devices can employ a multi-tasking operating system.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile stations 13 will typically include one or more RANs and a regional circuit and/or packet switched network and associated signaling network facilities.

Physical elements of a RAN operated by one of the mobile service providers or carriers include a number of base stations represented in the example by the base stations (BSs) 19. Although not separately shown, such a base station 19 typically comprises a base transceiver system (BTS) which communicates via an antennae system at the site of base station and over the airlink with one or more of the mobile stations 13, when the mobile stations are within range. Each base station typically includes a BTS coupled to several antennae mounted on a radio tower within a coverage area often referred to as a "cell." The BTS is the part of the radio network that sends and receives RF signals to/from the mobile stations 13 that the base station 19 currently serves.

The radio access networks also include a traffic network represented generally by the cloud at 21, which carries the user communications for the mobile stations 13 between the base stations 19 and other elements with or through which the mobile stations communicate. In some examples, the mobile traffic network 21 includes network elements that support LBS services such as mobile switching centers (MSCs) 30, signal transfer points (STP) 34, mobile positioning center (MPC) 32, and a position determining entity (PDE) 37. The network can also include other elements that support functionality other than location based services such as messaging service messages and voice communications. Examples of other network elements that may be used in support of messaging service message communications include, but are not limited to, message centers (MCs) 39, home location registries (HLRs) 38, simple messaging service point-to-point (SMPP) gateway 40, and other network elements such as wireless internet gateways (WIGS), and visitor location registers (VLRs) (not shown). Other individual elements such as switches and/or routers forming the traffic network 21 are omitted here form simplicity. It is understood that the various network elements can communicate with each other and other aspects of the mobile communications network 10 and other networks (e.g., the public switched telephone network (PSTN) and the Internet) either directly or indirectly.

The mobile switching center (MSC) 30 is responsible for managing communications between the mobile station and the other elements of the network 10. In addition, the MSC 30 is responsible for handling voice calls and messaging service message requests as well as other services (such as conference calls, FAX and circuit switched data, messaging service communications, Internet access, etc.). The MSC 30 sets up and releases the end-to-end connection or session, and handles mobility and hand-over requirements during the call. The MSC 30 also routes messaging service messages to/from the mobile stations 13, typically from/to an appropriate MC 39. The MSC 30 is sometimes referred to as a "switch". The MSC 30 manages the cell sites, the voice trunks, voicemail, and SS7 links.

The message center (MC) 39, in some examples, allows messaging service messages to be exchanged between mobile telephones and other networks. For SMS messaging, for example, the MC 39 receives packet communications containing text messages from originating mobile stations and forwards the messages via the signaling resources and the signaling channels to the appropriate destination mobile stations. The MC 39 may receive messages from external devices for similar delivery to mobile stations, and the MC 39 may receive similar messages from the mobile devices and forward them to servers or terminal devices, in either case, via an Internet Protocol (IP) packet data network.

In some examples, the MC 33 can also be considered or include functionality that may be considered that of a Short Messaging Service Message Center (SMSC) or a Message Register (MR). Wireless carriers developed the short message service (SMS) to transmit text messages for display on the mobile stations. In many existing network architectures, the SMS traffic uses the signaling portion of the network 21 to carry message traffic between a Short Message Service Center (SMSC) 39 and the mobile stations. The SMSC supports mobile station to mobile station delivery of text messages. However, the SMSC also supports communication of messages between the mobile stations and devices coupled to other networks. For example, the SMSC 33 may receive incoming IP message packets from the Internet 29 for delivery via the network 21, one of the base stations 19 and a signaling channel over the air link to a destination mobile station. For this later type of SMS related communications, the network 10 also includes one or more Short Message Peer-to-Peer (SMPP) protocol gateways 40.

In other examples, the MC 39 can include functionality related to the Enhanced Messaging Service (EMS) or Multimedia Messaging service (MMS). An EMS message can have special text formatting (such as bold or italic), animations, pictures, icons, sound effects and special ring tones. MMS messages support the sending and receiving of multimedia messages (e.g., images, audio, video and their combinations) to (or from) MMS-enabled mobile stations. In some examples, the MC 39 can be considered in whole or in part a multimedia messaging service center (MMSC).

Although a single MC 39 is shown, a network 10 will often have many geographically dispersed MCs 39. The MCs 39 can include destination routing tables (DRTs). In essence the DRTs are databases within the MCs 39. A DRT contains a list of the MDNs that are associated with the various MCs 39. For example, a first MDN is associated with a MC 39 in Minnesota while a second MDN is associated with a MC 39 in Virginia. The DRTs are used to determine which MC 39 should attempt to deliver an incoming messaging service message to the destination MDN. For example, if a user associated with the MC in Minnesota sends an SMS to a user associated with the MC 39 in Virginia, the Minnesota MC 39 sends the SMS to the Virginia MC 33 for delivery to the destination MDN. The communication among the MCs 39 occurs using know protocols such SMPP and the like.

The HLR 38, in some examples, stores a subscriber profile for each of the wireless subscribers and their associated mobile stations 13, 15, and 17. The HLR 38 may reside in an MSC 30 or in a centralized service control point that communicates with the MSC(s) 34 via an out-of-band signaling system such as an SS7 network. The HLR 38 stores for each mobile subscriber the subscriber's mobile directory number (MDN), the mobile identification number (MIN), and information specifying the wireless services subscribed to by the mobile subscriber, such as numeric paging or text-based paging, data communication services, etc. Of course, the HLR 38 can also be a stand-alone device. The HLR also tracks the current point of attachment of the mobile station to the network, e.g., the identification of the MSC 30 with which the mobile station is currently registered to receive service.

The visitor location register (VLR) (not shown) is, in some examples, a temporary database of the mobile stations that have roamed into the particular area which it serves. The VLRs for a region often are implemented in or in association with a MSC 30. Each base station 19 in the network is served by a single VLR, hence a subscriber cannot be present in more than one VLR at a time. The data stored in the VLR has either been received from the HLR 38, or collected from the mobile station.

The SMPP gateway 40 provides functionality to transport messaging service messages to other mobile communication networks and also receive messaging service messages from other networks. The SMPP gateway 34 supports communications using the SMPP protocol. SMPP gateways 40 are Short Message Peer-to-Peer (SMPP) gateways 40 used to connect the wireless communication network (such as an Internal Protocol IP network on the left of the Gateway) to another network (such as a public Internet network on the right of the Gateway). The SMPP Gateway 40 allows the MC 39 to receive and send messages in IP packet format. The SMPP Gateway 40 is an entity within the wireless network 10 that acts as an intermediary between the wireless service provider network and other networks. For example, the SMPP Gateway 40 converts messages in protocol(s) used by other applications and devices, e.g. Extensible Markup Language (XML), Hypertext Mail Protocol (HTMP), etc., to and from the SMPP protocol. The SMPP messages ride on IP transport, e.g. between the SMPP Gateway 40 and the MC 39.

The PDE 37 is a network element that manages the position or geographic location determination of each mobile station 13. The exemplary network 10 utilizes an assisted GPS (aGPS) approach to the determination of mobile station location, in which the mobile station 13 takes measurements of signals from a number of GPS satellites 39 and interacts with the PDE 37 to process those measurements so as to determine the latitude and longitude (and possibly altitude) of the current location of the mobile station 13. The location information may be provided to another entity, such as an emergency service point in a 911 scenario or used to calculate a rate of travel based on changes in the location of the mobile station.

The PDE system 37 is essentially a general purpose programmable device with an interface for data communication via the network 10 running server software and running programming for implementation of the PDE functions, such as device authentication, data cache and processing queue management. The PDE 37 stores (e.g. in cache memory) or has access to a complete and up to date set of the satellite data for the constellation of GPS satellites 39 needed to allow computation of position based on pseudorange measurements of satellite signals by mobile stations 13. The data may include that associated with the entire constellation but will at least include the data for the satellites expected to be broadcasting into the geographic region serviced by the network 10.

When a mobile station 13 attempts a GPS position fix, the mobile station 13 provides information allowing the PDE 37 to perform a pre-fix. Typically, the mobile station 13 will provide data identifying the base station 19 through which it is receiving service (and possibly the serving sector). In some implementations, the PDE 37 may receive data regarding several base stations/sectors and signal strengths thereof, for trilateration. The PDE 37 uses information about base station location(s) to process the data received from the mobile station so as to determine a region (e.g. area of the cell or sector, or a general area triangulated based on signals from several base stations) that the mobile station 13 is likely located within. The PDE 37 then uses the pre-fix location to parse the satellite data down, to assistance data that the mobile station 13 at the particular location needs in order to take GPS readings. The PDE 37 sends the parsed satellite data to the mobile station 13, for use in taking measurements of signals from appropriate satellites 39. The GPS assistance data may contain selected satellite almanac, satellite visibility, Doppler and clock correction information.

The mobile station 13 will, in turn, use this information (also known as acquisition assistance records) to take multiple satellite pseudorange measurements. Depending on the device/network configuration, the mobile station 13 or the PDE 37 can then calculate a final fix using these pseudorange measurements. The final fix computation provides latitude and longitude (and possibly altitude) coordinates for the current location of the mobile station 13. Using multiple measurements, the mobile station 13 can determine a rate of travel of the mobile station 13. Exceeding a predetermined rate can cause the DNDA 15 to be executed by the mobile station 13.

If the mobile station 13 has full GPS computation capability, the station 13 can calculate the current latitude and longitude of the mobile station itself. This is useful when the mobile station operates in stand-alone mode and calculates the rate of travel of the mobile station 13.

In addition, the traffic network portion 21 of the mobile communications network 10 connects to a private data network 36. The private data network 36 connects to the traffic network portion 21 via a gateway (not shown). The gateway can provide protocol conversions between the protocols used by the traffic network 21 and the protocols used by the private data network 36.

In communication with the private data network 36 can be various auxiliary services servers that provide additional services to the users of the network 10 and/or to operations support personnel of the service provider or carrier that operates the network 10. For example, the carrier will also offer its subscribers on-line access to a variety of functions related to the subscribers' accounts, such as review of billing statements and usage data, on-line payment, subscription changes, password control or the like. For that purpose, the carrier in our example operates a customer account web server 43, offering a 'MyAccount' (Now MyVerizon) type subscriber interface via the Internet. Hence, a user's terminal, such as PC 31, may be used to access on-line information about a subscriber's account, which the mobile carrier makes available via the carrier's MyAccount web site accessible through the Internet 29. Of note for purposes of the present discussions, the web site provides secure user access to configure the operation of the DNDA 15, for example, to set-up a schedule of activating and deactivating the DNDA 15. For example, if the account holder and user of the DNDA 15 has a regularly scheduled meeting, they can configure the DNDA 15 to execute during that period using the web site. Of course, this can also be configured on the mobile station 13 via the DNDA 15. Further, one or more response message can be configured, created, or edited using the web site or the user interface on the mobile station and the DNDA.

Figure 2:
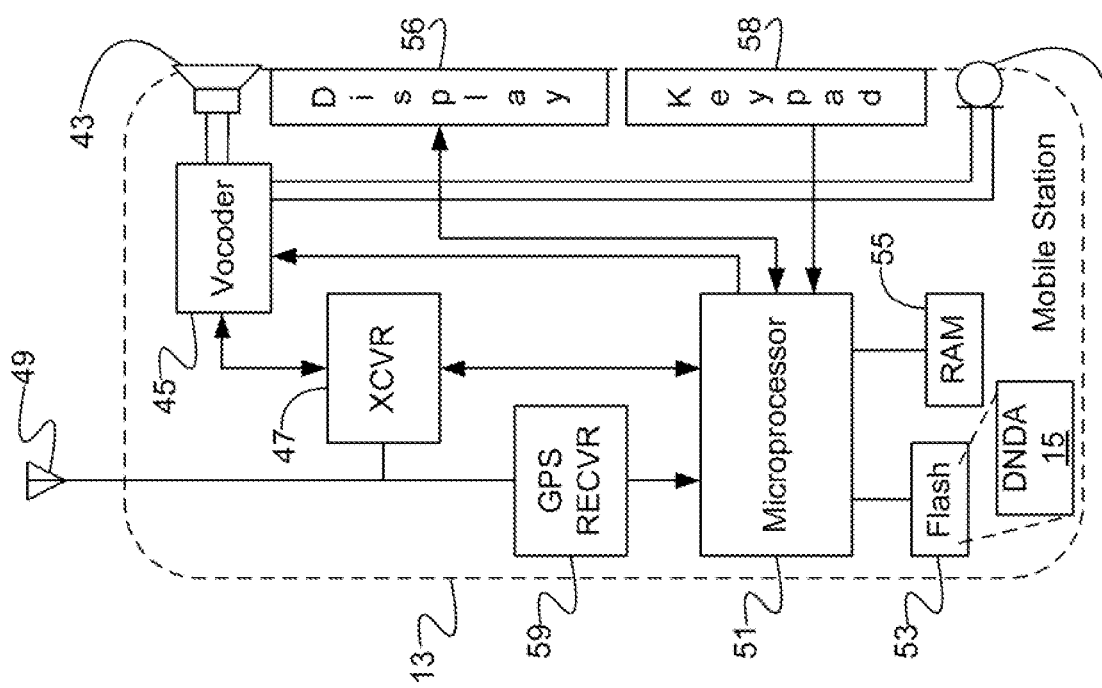
FIG. 2 is a simplified functional block diagram of a mobile station.

With reference to FIG. 2 a block diagram illustrating a GPS enabled mobile station 13 is shown and described. Although the station 13 may be incorporated into a vehicle mounted mobile unit or into another device, such as a portable personal computer or PDA, for discussion purposes the illustration shows the station 13 in the form of a handset. The handset embodiment of the mobile station 13 functions as a digital wireless telephone station. For that function, the station 13 includes a microphone 42 for audio signal input and a speaker 43 for audio signal output. The microphone 42 and speaker 43 connect to voice coding and decoding circuitry (vocoder) 45. For a voice telephone call, for example, the vocoder 45 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes a digital transceiver (XCVR) 47. The concepts discussed here encompass embodiments of the station 13 utilizing any digital transceivers that conform to current or future developed digital wireless communication standards. For example, the transceiver 47 could be a TDMA or GSM unit designed for cellular or PCS operation. In the present embodiments, the digital transceiver 47 is a CDMA transceiver compatible with operation via an IS-95 network or a 1x network, to provide both voice and packet data communications. Also, the mobile station 13 may utilize either or both of 3GPP2 (1XRTT and EVDO) technologies and 3GPP (LTE/GSM/UMTS) technologies. In other Multimode transceivers also may be used.

The transceiver 47 provides two-way wireless communication of information, such as vocoded speech samples and/or digital message information. The transceiver 47 also sends and receives a variety of signaling messages in support of the various services provided via the station 13 and the network 10. Communications via the transceiver 47 and the antenna 49 may include various messages related acquisition assistance, position determination and related location based services. Communications via the transceiver 47 and the antenna 49 also include various SMS, EMS and/or MMS messages, including the automatic response messages controlled by execution of the DNDA 15. The transceiver 47 connects through RF send and receive amplifiers (not separately shown) to an antenna 49. In the example, the transceiver 47 is configured for RF communication in accord with a digital wireless protocol. The station 13 may include one or more additional transceivers, for example, for operation in an analog mode or in accord with an alternative digital standard.

A microprocessor 51 serves as the programmable controller in that it controls all operations of the mobile station 13 in accord with programming that it executes. The mobile station 13 also includes flash type program memory 53 and/or a non-volatile random access memory (RAM) 55, for storing various software routines and mobile configuration settings, such as mobile identification number (MIN), response messages, etc. In a present implementation, the flash type program memory 55 stores an operating system, device driver software, call processing software and vocoder control software; and the memory may store any of a wide variety of other applications, such as client browser software and short message service software.

The mobile station 13 can also include other functionality. For example, the mobile station can include a Bluetooth transceiver (not show). The Bluetooth transceiver can be used to pair the mobile station 13 with a portion of the vehicle 14.

Of note for purposes of this discussion, the stored program software will also include the Do-Not-Disturb Application (DNDA) 15. The DNDA 15 provides various functionalities during its operation. For example, the DNDA 15, when active, enables the mobile station to automatically respond to incoming messaging service messages with a response message such as "I am not available to respond at this time." Of course, the response message is user configurable both via the mobile station 13 and via the above-described web site. For example, when the end-user of the mobile station 13 travels at a rate equal to or greater than 10 miles-per-hour the DNDA 15 is begins executing on the mobile station 13 automatically. Thus, the safety of the end-user is enhanced. In such an example, the mobile station 13 leverages the GPS receiver 59 by taking location measurements to determine the rate of travel of the mobile station 13.

Further, the DNDA 15, in some instances, can enable the mobile station to convert any incoming messaging service message to speech. Thus the end-user of the mobile station can hear the incoming message via the speaker 43 of the mobile station 13. The DNDA 15 would cause the mobile station to automatically respond to the incoming message with the predetermined response to alert the sender not to expect a response.

Also, the DNDA 15 may enable filtering of the incoming messages to various degrees. For example if the incoming message is tagged with a key phrase or term (e.g., emergency), the DNDA 15 can alert the end-user of the mobile station 13 accordingly. For example, a special tone (e.g., siren) can be used to alert the end-user. Also, such a tag can trigger the text-to-speech conversion. The tag can occur at a predetermined place in the message such as the first term or last term.

Additional functionality of the DNDA 15 can include sending a second response message to each or a sub-set of the received incoming messages while the DNDA 15 was active upon exiting the DNDA 15. For example, if the end-user arrives at their destination and thus slows to a rate below the predetermined rate, the DNDA 15 can cause the mobile station 13 to send a second message to one or more senders of messages during the time of travel. The second message may alert the senders that the end-user has arrived at their destination and will contact them soon. Of course, the second messages can also be triggered based on the unpairing of the mobile station 13 and the telematics unit 15. Also, the end-user can exit the DNDA 15 using the mobile station 13.

In one instance, the DNDA 15 is downloaded from one of the other network elements to the mobile station 13 and stored therein. Another approach includes downloading the programming over the air, from a third party server (not shown), from a OTAF provisioning system (not shown) or the like. The DNDA 15 can also be loaded on the mobile station 13 by connecting the mobile station 13 to a personal computer (PC) and transferring the DNDA 15 from the PC to the mobile station 13 using known techniques.

The memories 53, 55 also store various data, such as telephone numbers and server addresses and data input by the user. For example, the memory 53 and/or the memory 55 will at various times one or more predetermined response messages used by the DNDA 15. Similarly, one of the memories may store data for an activation schedule for the DNDA 15.

As shown, the digital telephone handset 13 includes a display 56 for displaying messages, menus or the like, call related information dialed by the user, calling party numbers, incoming messaging service messages, and other information. Also, the display is used to input information such as a response message or to configure the DNDA 15. If the mobile station executes location based service applications, the display 56 may provide other information regarding the determined location and/or surrounding areas, e.g. LAT/LON data, a rate of travel of the mobile station 13, and other information. A keypad 58 enables dialing digits for voice and/or data calls and generating selection inputs keyed by the user based on any displayed menu. The display 56 and keypad 58 are the physical elements providing a textual or graphical user interface. In addition to normal telephone related input/output, these elements are also used for display of menus and other information to the user and user input of selections. For example, these elements can be used to input information related to the response message or to configure other parameters of the DNDA 15. Also, the SMS options panel provided on certain mobile stations can be used to input information related to the response message. Of course other user interface elements may be used, such as a stylus and touch sensitive display screen, as in a PDA or mobile smartphone.

For position determination and associated location based services such as rate of travel determination, the mobile station 13 also includes a GPS receiver 59. Under control of the microprocessor 51, the GPS receiver 59 receives and processes signals from one or more satellites of the constellation of GPS satellites 39. From its processing, the GPS receiver 59 supplies GPS data to the microprocessor 51, such as pseudo-range measurements and associated PN codes for measured satellite signals. Associated computations may be performed in the microprocessor or by a processor or the like included in the GPS receiver.

If the receiver 59 or the combination of the receiver and the microprocessor 51 are configured to provide a fully functional GPS position determination device, the station 13 could process the pseudorange measurements, absolute times of transmission of the GPS signals, and the satellite position data to compute the station's latitude and longitude. However, because of size/space/cost constraints on the design of the mobile stations 13, the GPS receiver 59 in the mobile station 13 often chooses to use only a reception capability, not the full GPS processing capability to resolve position from signals received from the satellites 39. Hence, the receiver 59 supplies the GPS measurement and code data to the microprocessor 51, which in turn formats the data and sends it to the PDE 37 using the wireless transceiver 47. The PDE 37 performs the data processing necessary to determine the latitude and longitude of the station 13 and transmits that data where needed, which in some cases will be back to the mobile station 13 for further processing by execution of the DNDA 15 or other applications of the mobile station 13

Figure 3:
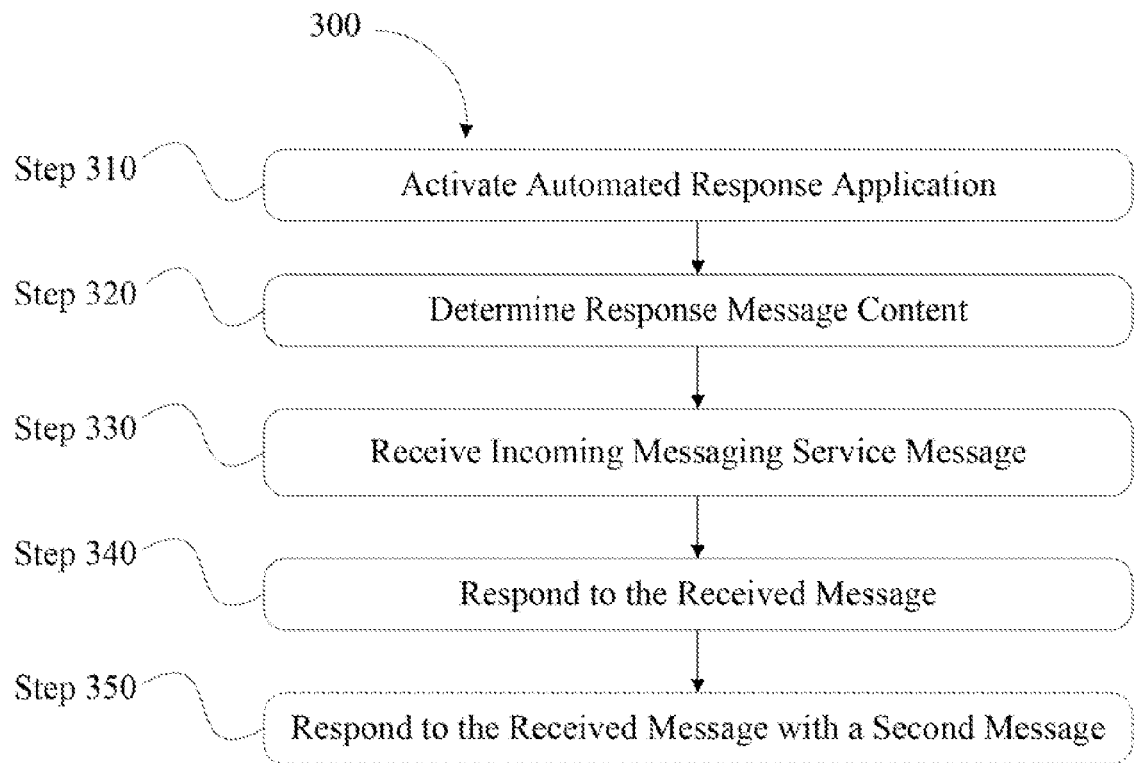
FIG. 3 is a flow chart showing an exemplary method of automatically responding to messaging service messages by a mobile station.

With reference to FIG. 3 an exemplary method 300 of automatically responding to a mobile messaging service message, received at a mobile station 13 is shown and described. The method 300 includes activating (step 310) an automated response application (e.g., the DNDA 15) resident in the user's mobile station 13. As discussed above, the application can be activated in many ways. For example, the end-user of the mobile station 13 can activate the application via the user interface of the mobile station 13. The application can be configured to execute at scheduled times. The schedule can be created and modified via the user interface of the mobile station 13 and the web site. Also, the application can be executing automatically when the mobile station exceeds a predetermined rate of travel (e.g., seven miles-per-hour). Also, the application can be executed in response the mobile station 13 being paired to the vehicle 14. In some examples, the mobile station 13 is paired to telematics unit 16 of the vehicle. Of course, the mobile station can be paired to other devices (e.g., a fob 16', a radio 16', or a hands-free Bluetooth unit) within the vehicle.

The method 300 also includes determining (step 320) response message content for use by the activated application. For example, the response message can be preconfigured using the mobile station 13 and the web site. Also, different response messages can be sent to senders of different incoming messages. For example, based on the originating MDN of the incoming message, the application may cause the mobile station to generate and send back a specific response message. Also, depending on the time of day a specific response message can be sent. For example, if it is after 10 pm, the response message may indicate that the end-user will respond the next business day.

The method 300 also includes receiving (step 330) a mobile messaging service message. The message is received at the mobile station over a communications channel established between a mobile station and a mobile communications network while the application is active. For example, the mobile station 13 may receive an SMS message via the network 10 via the MC 39, and other network components. The specific sequence of steps of how an SMS or other messaging service message (e.g., EMS or MMS) propagates through the network 10 are omitted.

Additionally, the method 300 includes responding (step 340) to the received message. Execution of the application by the processor causes the mobile station to respond without interaction by the end-user of the mobile station. That is, the end-user is not required to trigger the response by the mobile station. For example, the message is automatically generated and sent through the network and is addressed for communication through the network back to the sender of the incoming message that the mobile station received in step 330, without requiring the end-user to interact with the mobile station 13.

In some instances, the end-user can be prompted to send the response but is not required to generate the content of the response. For example, a predetermined response message is created but not sent until the end-user presses a specified key. The response message is a mobile messaging service message containing the response message content.

In another instance, the method 300 also includes automatically responding (step 350) to one or more of the received messages with a second message when the application ceases execution. The second message can also be an SMS or other messaging service type message sent back through the network for the sender of the received incoming message. The second response message can indicate the end-user of the mobile station has stopped using the application (e.g. do-not-disturb is no longer active) and will be able to respond to the original message in due course. For example, if the end-user is traveling to a specific destination the DNDA 15 enables the user's mobile station to respond to a received message during their travel. Upon reaching the destination, the end-user exits the DNDA 15. Upon initiating the exit, the DNDA 15 causes the mobile station to send a second response message to the one or more of the received messages to let the sender(s) know that the end-user may be able to respond soon. Other events can trigger the second message. For example, the unpairing of the mobile station 13 and the vehicle 14 or the mobile station 13 remaining at a rate of travel less than the predetermined threshold for a specific period of time.

FIGS. 4 and 5 provide functional block diagram illustrations of general purpose computer hardware platforms. FIG. 4 illustrates a network or host computer platform, as may typically be used to implement a server or other network element (e.g., MSC 30, PDE 37, . . . ). FIG. 5 depicts a computer with user interface elements, as may be used to implement a personal computer (PC) or other type of work station or terminal device, although the computer of FIG. 5 may also act as a server if appropriately programmed. For example, such general purpose platforms may store the DNDA 15 and load the application into a mobile station 13, via a network communication if the platform is a server or via a local link if the platform is a PC. It is believed that those skilled in the art are familiar with the structure, programming and general operation of such computer equipment and as a result the drawings should be self-explanatory.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load.

Hence, aspects of the methods of automatically responding to messaging service messages by a mobile station 13 can be executed on a mobile station and on a network element such as a server. Program aspects of the technology may be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from one computer or processor into another computer or processor. For example, the DNDA 15 software can be communicated to the mobile station 13. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution Those skilled in the art will recognize that the present teachings are amenable to a variety of modifications and/or enhancements. For example, although some aspects of the present disclosure describe the DNDA 15 responding only to messaging service messages, it is possible to extend the teaching to respond to incoming voice telephone calls with messaging service messages as well.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
 aGPS: assisted global position system
 ANA: assisted navigation application
 BS: base station
 BTS: base transceiver system
 CDMA: code division multiple access
 CD-ROM: compact disc read-only memory
 DNDA: do not disturb application
 DVD: digital video disc
 DVD-ROM: digital versatile (video) disc read-only memory
 EPROM: erasable programmable read-only memory
 EV-DO: evolution-data optimized
 ESN: electronic serial number
 GDF: geographic data files
 GPS: global positioning system
 GSM: global system for mobile communications
 HLR: home location register
 IP: Internet protocol
 IR: infrared
 LBS: location based services
 LCD: liquid crystal display
 LTE: long-term evolution
 MC: message center
 MIN: mobile identification number
 MPC: mobile positioning center
 MS: mobile station
 MSC: mobile switching center
 PC: personal computer
 PDE: position determining entity
 PN: pseudo-random noise
 PROM: programmable read-only memory
 PSTN: public switched telephone network
 RAM: random access memory
 RAN: radio access network
 RF: radio frequency
 SIF: Standard Interchange Format
 SMS: short messaging service
 SS7: signaling system 7
 STP: signaling transfer points
 TCP: transmission control protocol
 TDMA: time-division multiple access
 UMTS: universal mobile telecommunications system
 USB: universal serial bus
 VLR: visitor location register
 WAN: wide are network
 XCVR: transceiver

What is claimed is:

1. A method, comprising:
receiving a mobile messaging service message, at a mobile station over a communications channel established between the mobile station and a mobile communications network, while an automated response application stored on the mobile station is active;
under control of the active application, responding to the received mobile messaging service message by at least:
automatically generating appropriate response message content that is able to be different dependent on predetermined conditions associated with the received mobile messaging service message; and
sending a response mobile messaging service message containing the response message content from the mobile station through the mobile communications network.

2. The method of claim 1, wherein the response mobile messaging service message is sent automatically in response to generating the response message content.

3. The method of claim 1, wherein the predetermined conditions include an originating source of the mobile messaging service message.

4. The method of claim 1, wherein the predetermined conditions include time of day of reception of the mobile messaging service message.

5. The method of claim 1, further comprising automatically deactivating the automated response application when a predetermined condition is met.

6. The method of claim 5, further comprising sending a follow up response mobile messaging service message from the mobile station through the mobile communications network to the same destination as the response mobile messaging service message, the follow up response mobile messaging service message indicating that the automated response application has been deactivated.

7. The method of claim 5, wherein the predetermined condition includes the mobile station determining that a predetermined location has been reached.

8. The method of claim 5, wherein the predetermined condition includes the mobile station determining that the mobile station has been unpaired with a vehicle communication system.

9. The method of claim 5, wherein the predetermined condition includes the mobile station determining that the mobile station has been traveling at a rate of travel less than a predetermined threshold for a specific period of time.

10. The method of claim 1, further comprising:
receiving and responding to a plurality of mobile messaging service messages from different sources;
determining whether to send the follow up response mobile messaging service message to a particular destination based on a source of the respective mobile messaging service message associated with the destination; and
sending the follow up response mobile messaging service message to only a subset of the destinations.

11. A mobile station comprising:
a memory storing an application; and
a processor, in communication with the with the memory, the processor executing the application when the application is active, wherein execution of the application configures the processor so that the mobile station is capable of performing functions to:
receive a mobile messaging service message, at the mobile station over a communications channel established between the mobile station and a mobile communications network while the application is active;
automatically generate appropriate response message content that is able to be different dependent on predetermined conditions associated with the received mobile messaging service message; and send a response mobile messaging service message containing the response message content from the mobile station through the mobile communications network.

12. The mobile station of claim 11, wherein the response mobile messaging service message is sent automatically in response to generating the response message content.

13. The mobile station of claim 11, wherein the predetermined conditions include an originating source of the mobile messaging service message.

14. The mobile station of claim 11, wherein the predetermined conditions include time of day of reception of the mobile messaging service message.

15. The mobile station of claim 11, wherein the application further configures the processor to be capable of automatically deactivating the automated response application when a predetermined condition is met.

16. The mobile station of claim 15, wherein the application further configures the processor to be capable of sending a follow up response mobile messaging service message from the mobile station through the mobile communications network to the same destination as the response mobile messaging service message, the follow up response mobile messaging service message indicating that the automated response application has been deactivated.

17. The mobile station of claim 15, wherein the predetermined condition includes the mobile station determining that a predetermined location has been reached.

18. The mobile station of claim 15, wherein the predetermined lined condition the mobile station determining that the mobile station has been unpaired with a vehicle communication system.

19. The mobile station of claim 15, wherein the predetermined condition includes the mobile station determining that the mobile station has been traveling at a rate of travel less than a predetermined threshold for a specific period of time.

20. The mobile station of claim 11, wherein the application further configures the processor to be capable of:
receiving and responding to a plurality of mobile messaging service messages from different sources;
determining whether to send the follow up response mobile messaging service message to a particular destination based on a source of the respective mobile messaging service message associated with the destination; and
sending the follow up response mobile messaging service message to only a subset of the destinations.

* * * * *